US012809575B2

(12) United States Patent
Yamamoto et al.

(10) Patent No.: US 12,809,575 B2
(45) Date of Patent: Nov. 24, 2026

(54) SOUND APPARATUS, ACOUSTIC DEVICE SETTING METHOD, AND NON-TRANSITORY COMPUTER-READABLE STORAGE MEDIUM STORING PROGRAM

(71) Applicant: Yamaha Corporation, Hamamatsu (JP)

(72) Inventors: Kodai Yamamoto, Hamamatsu (JP); Kosuke Saito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 192 days.

(21) Appl. No.: 18/754,407

(22) Filed: Jun. 26, 2024

(65) Prior Publication Data

US 2025/0004702 A1 Jan. 2, 2025

(30) Foreign Application Priority Data

Jun. 28, 2023 (JP) ................................ 2023-106217

(51) Int. Cl.

| | |
|---|---|
| ***G06F 3/16*** | (2006.01) |
| ***H04H 60/04*** | (2008.01) |
| ***H04S 1/00*** | (2006.01) |
| ***H04S 7/00*** | (2006.01) |

(52) U.S. Cl.

CPC .............. *G06F 3/165* (2013.01); *G06F 3/162* (2013.01); *H04H 60/04* (2013.01); *H04S 1/007* (2013.01); *H04S 7/301* (2013.01); *H04S 2400/15* (2013.01)

(58) Field of Classification Search

None

See application file for complete search history.

(56) References Cited

U.S. PATENT DOCUMENTS

| | | | | |
|---|---|---|---|---|
| 10,620,907 | B2 * | 4/2020 | Saito | H04H 60/04 |
| 2025/0004698 | A1 * | 1/2025 | Yamamoto | G06F 3/165 |
| 2025/0004703 | A1 * | 1/2025 | Yamamoto | H04S 1/007 |

OTHER PUBLICATIONS

"Avid Venue", S6L System, Software 7.0.1, Jun. 16, 2023, pp. 1-454 (467 pages).

* cited by examiner

*Primary Examiner* — Hemant S Patel
(74) *Attorney, Agent, or Firm* — Crowell & Moring LLP

(57) ABSTRACT

A sound apparatus includes an acoustic device setting apparatus, and a controller. The controller is configured to receive a trigger requirement associated with an action and a reverse action. The controller is also configured to receive the action corresponding to the trigger requirement, and to associate the trigger requirement with the received action. The controller is also configured to receive the reverse action that is performed in a case in which the trigger requirement is not satisfied. The controller is also configured to associate the trigger requirement with the received reverse action.

11 Claims, 17 Drawing Sheets

SOUND APPARATUS, ACOUSTIC DEVICE SETTING METHOD, AND NON-TRANSITORY COMPUTER-READABLE STORAGE MEDIUM STORING PROGRAM

CROSS REFERENCE TO RELATED APPLICATIONS

This Nonprovisional application claims priority under 35 U.S.C. § 119(a) on Patent Application No. 2023-106217 filed in Japan on Jun. 28, 2023, the entire contents of which are hereby incorporated by reference.

BACKGROUND

An embodiment according to the present disclosure relates to an acoustic device setting method, an acoustic device setting apparatus, and a program.

"Avid VENUE|S6L System," [online], [retrieved on Jun. 16, 2023], the internet <URL: https://resources.avid.com/SupportFiles/VENUE/VENUE_S6L_System_Guide_v7.0.1.pdf> discloses an audio mixer in which, by configuring an event such that any action is set to a trigger and the set action is executed simultaneously when a trigger operation is performed, any action is also executed simultaneously when the trigger operation is performed.

SUMMARY

One embodiment of the present disclosure is directed to provide a more convenient acoustic device setting method that is able to collectively set a fixed movement when a certain requirement is satisfied and a fixed movement when the requirement is released.

An acoustic device setting method includes receiving a trigger requirement to be associated with an action and a reverse action, receiving the action corresponding to the trigger requirement, associating the trigger requirement with the received action, receiving the reverse action to be performed in a case in which the trigger requirement is not satisfied, and associating the trigger requirement with the received reverse action.

The acoustic device setting method is able to collectively set a fixed movement when a certain requirement is satisfied and a fixed movement when the requirement is released, and thus is able to further enhance convenience.

BRIEF DESCRIPTION OF THE DRAWINGS

FIG. 17 is a front view of the audio mixer 1 in a case in which the auto sync is ON.

DETAILED DESCRIPTION

Figure 1:
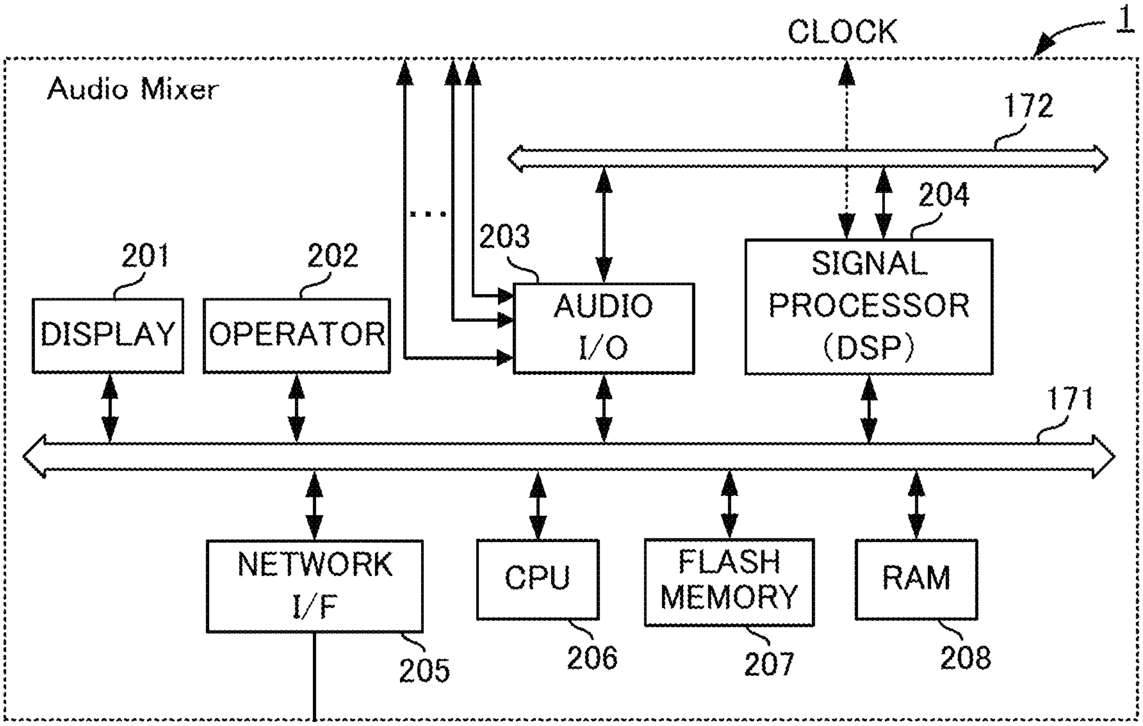
FIG. 1 is a block diagram showing a configuration of an audio mixer 1.

FIG. 1 is a block diagram showing a configuration of an audio mixer 1. The audio mixer 1 is an example of an acoustic device. The audio mixer 1 includes a component such as a display 201, an operator 202, and an audio I/O 203, a signal processor 204, a network I/F 205, a CPU 206, a flash memory 207, and a RAM 208.

These components are connected to each other through a bus 171. In addition, the audio I/O 203 and the signal processor 204 are also connected to a waveform bus 172 in order to transmit a digital audio signal.

The CPU 206 is a controller that controls a movement of the audio mixer 1. The CPU 206 performs various types of movements by reading a predetermined program stored in the flash memory 207 being a storage medium to the RAM 208 and executing the program. It is to be noted that the program may be stored in a server. The CPU 206 may download the program from the server through a network and may execute the program.

Figure 2:
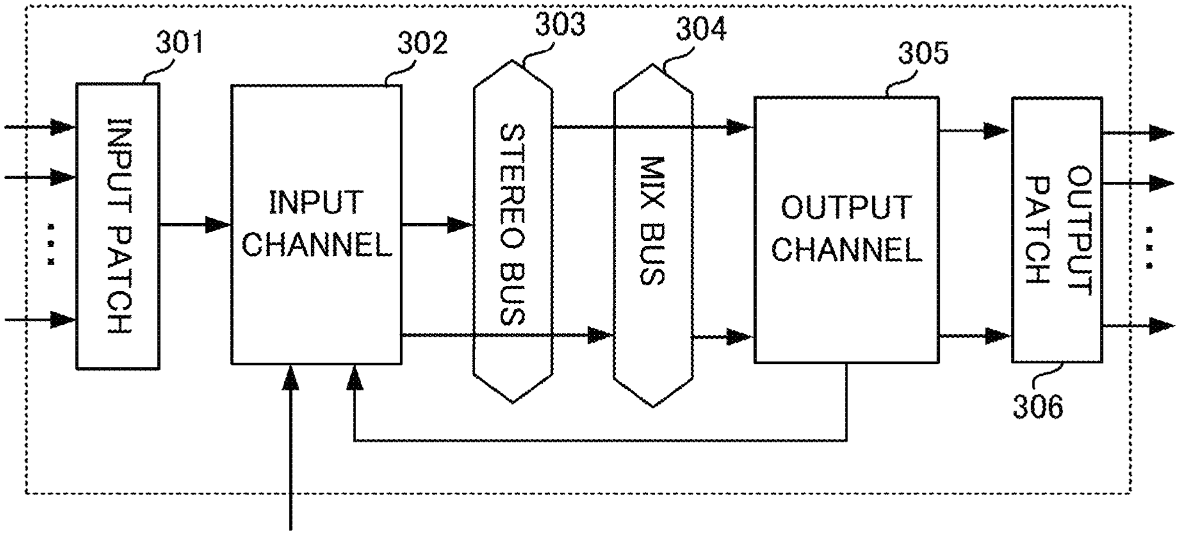
FIG. 2 is a block diagram showing a functional configuration of signal processing.

The signal processor 204 includes a DSP for performing various types of sound processing such as mixing processing. The signal processor 204 performs signal processing such as effect processing, level adjustment processing, and mixing processing, on the audio signal received through the network I/F 205 or the audio I/O 203. The signal processor 204 outputs a digital audio signal on which the signal processing has been performed, through the audio I/O 203 or the network I/F 205. FIG. 2 is a block diagram showing a functional configuration of the signal processing performed in the signal processor 204, the audio I/O 203 (or the network I/F 205), and the CPU 206. As shown in FIG. 2, the signal processing is functionally performed through an input patch 301, an input channel 302, a stereo bus 303, a MIX bus 304, an output channel 305, and an output patch 306.

Figure 3:
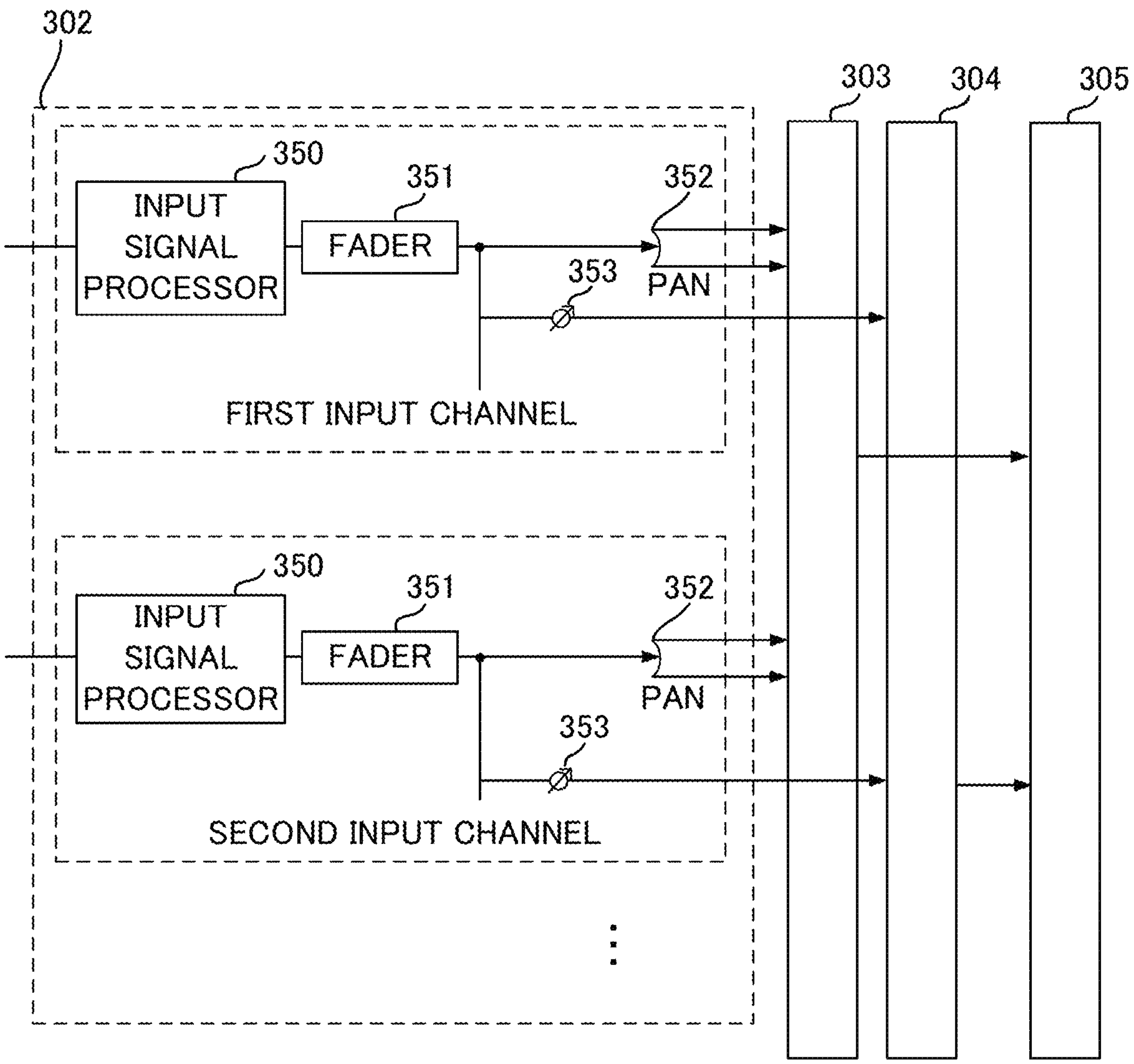
FIG. 3 is a block diagram showing a functional configuration of an input channel 302, a stereo bus 303, and a MIX bus 304.

The input patch 301 receives an audio signal from a microphone, a musical instrument, an amplifier for a musical instrument, or the like. The input patch 301 supplies the received audio signal to each channel of the input channel 302. FIG. 3 is a block diagram showing a functional configuration of the input channel. Each channel of the input channel 302 receives the audio signal from the input patch 301 and performs signal processing on the audio signal.

FIG. 3 is a block diagram showing a functional configuration of the input channel 302, the stereo bus 303, and the MIX bus 304. For example, a first input channel and a second input channel each include an input signal processor 350, a FADER 351, a PAN 352, and a send level adjustment circuit 353. Other input channels that are not illustrated include the same configuration.

The input signal processor 350 performs effect processing such as an equalizer or a compressor, level adjustment processing, or the like. The FADER 351 adjusts a gain of each input channel.

Figure 4:
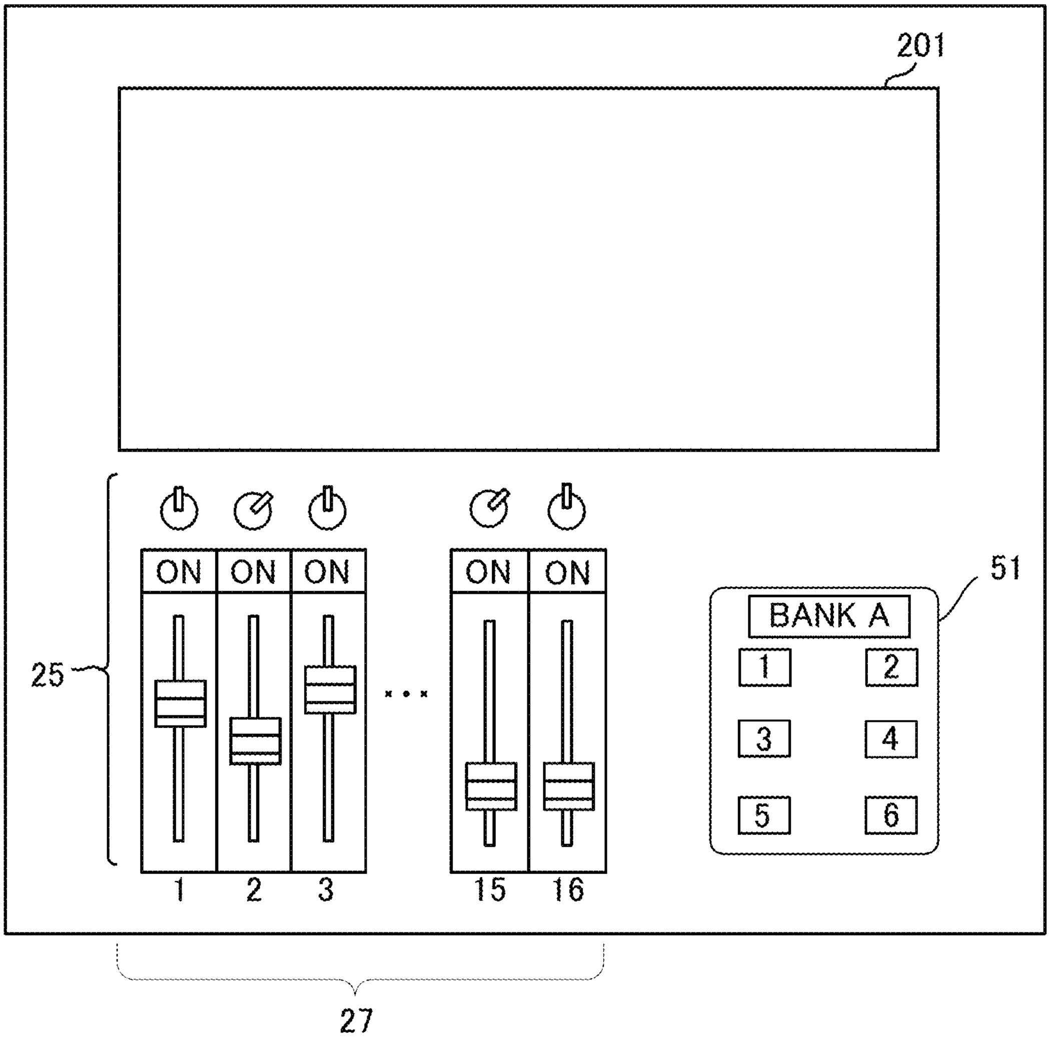
FIG. 4 is an external view of a housing of the audio mixer 1.

FIG. 4 is a front view of the audio mixer 1. The display 201 is disposed at the upper front of a housing. An operation panel area 25 is disposed at the lower front of the housing. A channel strip section 27 and a user-defined key area 51 are disposed in the operation panel area 25.

The channel strip section 27 includes, for example, eight input channel sections and one master section. A plurality of physical controllers including a slider, a switch, and a knob are disposed in each channel section. The slider corresponds to the FADER 351 of FIG. 3. A user of the audio mixer 1, by changing a position of the slider, adjusts the gain of a corresponding input channel.

A plurality of six user-defined keys (hereinafter, referred to as a UD key), in the present embodiment, are disposed in the user-defined key area 51. A user-defined key functions as a physical controller that executes a function assigned optionally to the audio mixer 1. In addition, the user-defined key area 51 is able to switch a plurality of banks and assign any six functions to each bank.

The knob of each channel section in the channel strip section 27 corresponds to, for example, the PAN 352 of FIG. 3. The user of the audio mixer 1, by turning the knob clockwise or counterclockwise, adjusts left-right level balance of a stereo. The audio signal distributed by the PAN 352 is sent out to the stereo bus 303. Alternatively, the knob corresponds to, for example, the send level adjustment circuit 353 of FIG. 3. The user of the audio mixer 1, by turning the knob clockwise or counterclockwise, adjusts a send level to the MIX bus 304. Alternatively, the slider is also able to function as an operator that adjusts the send level to the MIX bus 304. In such a case, the slider corresponds to the send level adjustment circuit 353 of FIG. 3.

The stereo bus 303 is a bus corresponding to a main speaker in a hall or a conference room. The stereo bus 303 mixes an audio signal to be sent out from each input channel. The stereo bus 303 outputs the mixed audio signal to the output channel 305.

The MIX bus 304 is a bus for sending out a mixed audio signal of the audio signal of one or more input channels to a specific acoustic device such as a monitor speaker or monitor headphones. The MIX bus 304 outputs the mixed audio signal to the output channel 305.

The output channel 305 performs the effect processing such as an equalizer or a compressor, the level adjustment processing, or the like, on the audio signal outputted from the stereo bus 303 and the MIX bus 304. The output channel 305 outputs the mixed audio signal on which the signal processing has been processed, to the output patch 306.

The output patch 306 assigns each channel of the output channel to any one of a plurality of ports serving as an analog output port or a digital output port. As a result, the audio signal on which the signal processing has been performed is supplied to the audio I/O 203 or the network I/F 205.

Figure 5:
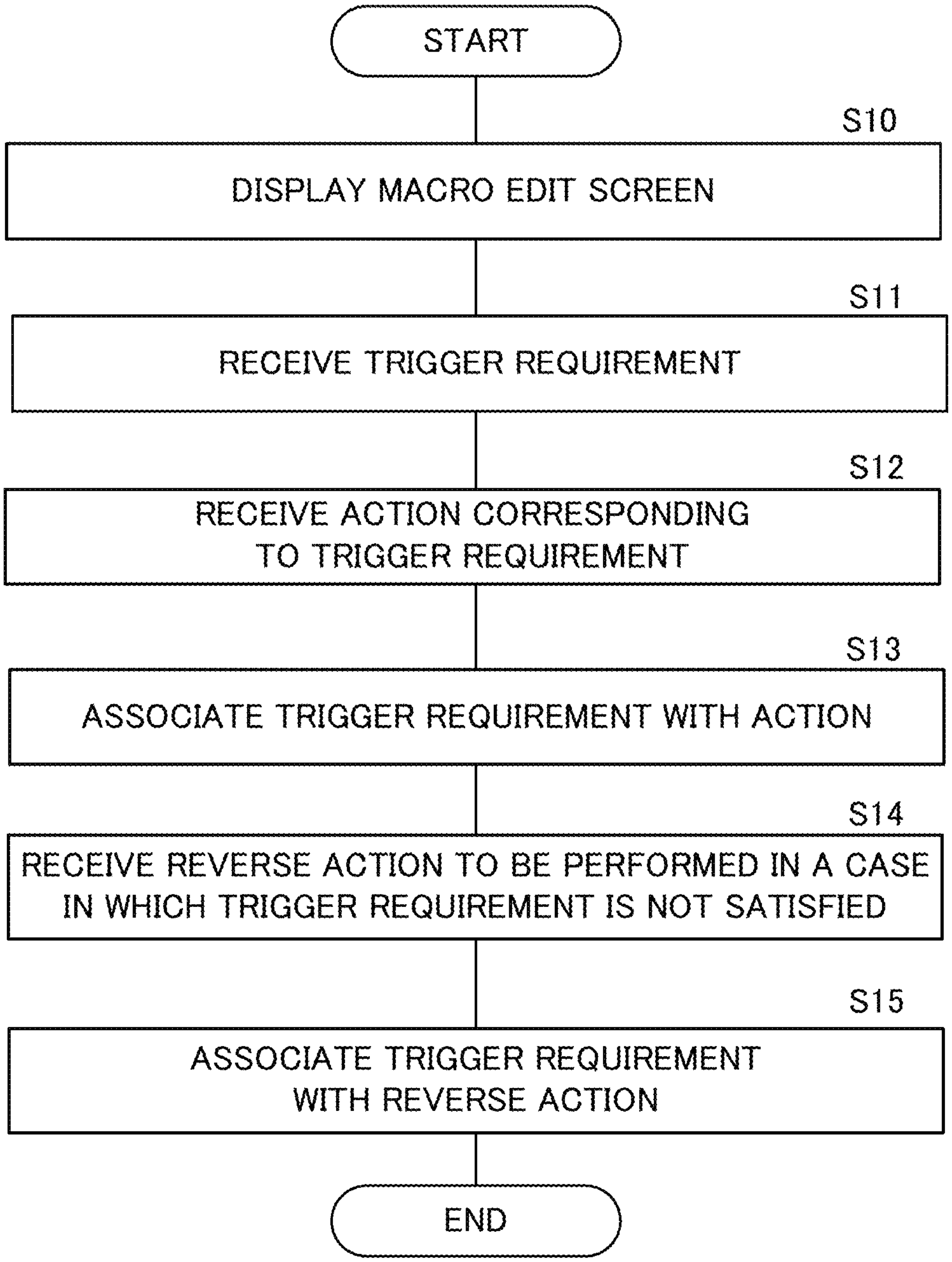
FIG. 5 is a flowchart showing a movement of an acoustic device setting method to be performed by a CPU 206.

FIG. 5 is a flowchart showing a movement of an acoustic device setting method to be executed by the CPU 206. The CPU 206 moves to execution in a case of receiving a recall operation of a macro editing function. The CPU 206, in the case of receiving the recall operation of the macro editing function, displays a macro edit screen on the display 201 (S10).

Figure 6:
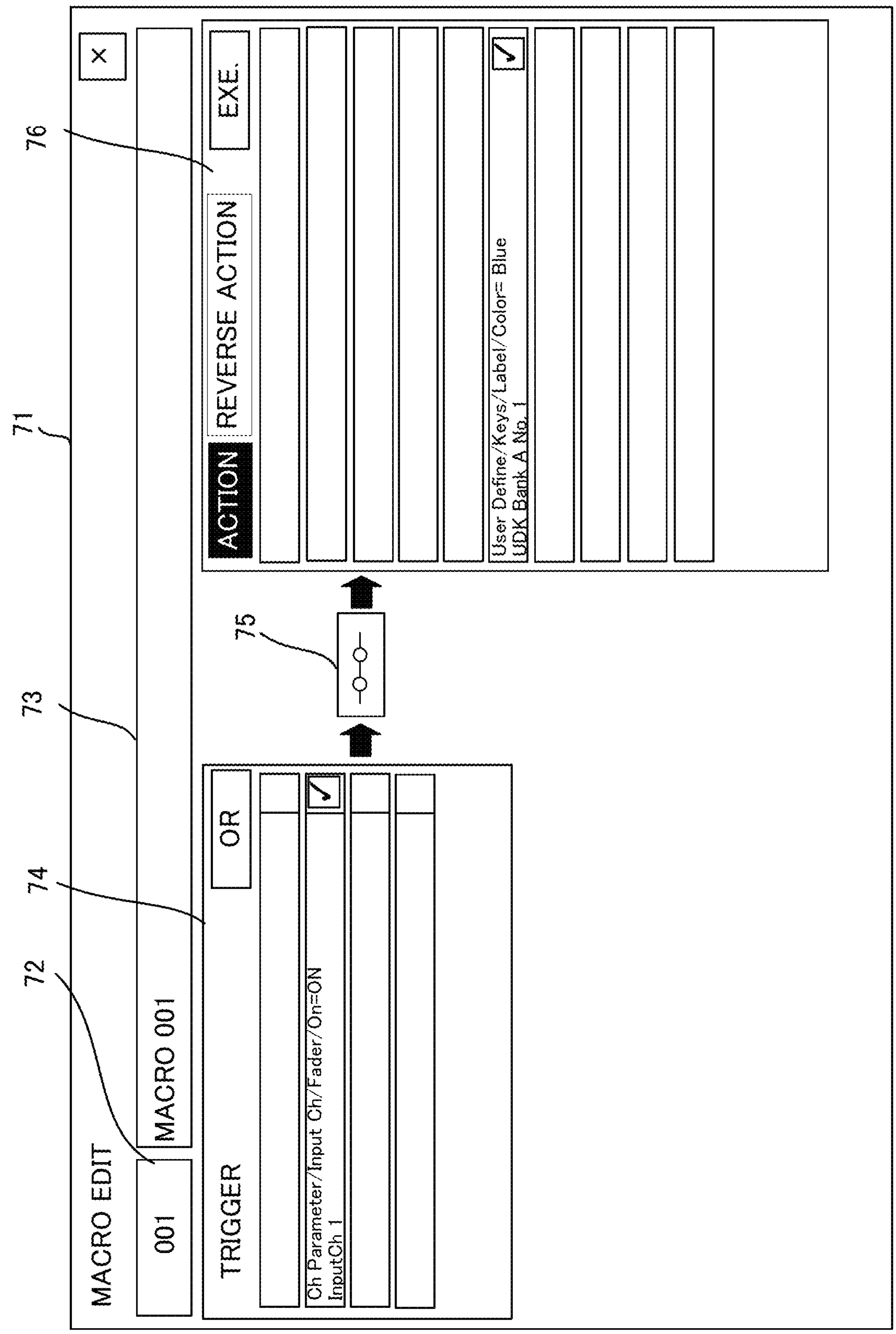
FIG. 6 shows an example of a macro edit screen displayed on a display 201 in a case in which a recall operation of a macro editing function is received.

FIG. 6 shows an example of a macro edit screen 71 displayed on the display 201 in a case in which the recall operation of the macro editing function is received. A macro shows the entire macro function including a trigger, an action, a reverse action, a condition, auto sync, or an enable switch (the condition, the auto sync, or the like will be described below). The macro function is a function to execute a predetermined operation (such as an action) in a case in which a state of a device satisfies a specific requirement (such as a trigger requirement) in the audio mixer 1. The macro edit screen 71 includes a management number display 72, a macro name inputter 73, a trigger requirement inputter 74, an enable switch 75, and an action inputter 76.

The audio mixer 1 receives a trigger requirement on the macro edit screen 71 (S11). In the example of FIG. 6, a user inputs a trigger requirement to the trigger requirement inputter 74 displayed on the left side of the macro edit screen 71. The trigger requirement mainly corresponds to a state of a physical controller for designating sound processing to an input, mixture, or output of an audio signal. However, the trigger requirement in the present disclosure includes all related to a state of the audio mixer 1. For example, a case in which power consumption of the audio mixer 1 reaches a certain value, a case in which CPU resource usage is greater than or equal to a predetermined value, or the like is also able to be inputted as the trigger requirement.

FIG. 6 shows an example in which the state of the physical controller for designating sound processing to an input of an audio signal is inputted as the trigger requirement. More specifically, in FIG. 6, as the trigger requirement, a case in which, in the input channel (Input Ch in the diagram) of parameters (Ch Parameter in the diagram), an ON switch (On in the diagram) of a fader (Fader in the diagram) of the first input channel (Input Ch 1 in the diagram) is turned ON (=ON in the diagram) is inputted.

The CPU 206 receives an action corresponding to the trigger requirement (S12). In the example of FIG. 6, the user inputs an action into the action inputter 76 displayed on the right side of the macro edit screen 71. In the example of FIG. 6, as the action, a movement such that, in the UD key (Keys in the diagram) of user definitions (User Define in the diagram), a display color (Label/Color) of Number 1 of Bank A (UDK Bank A No. 1 in the diagram) is turned to blue (=Blue in the diagram) is inputted.

Figure 7:
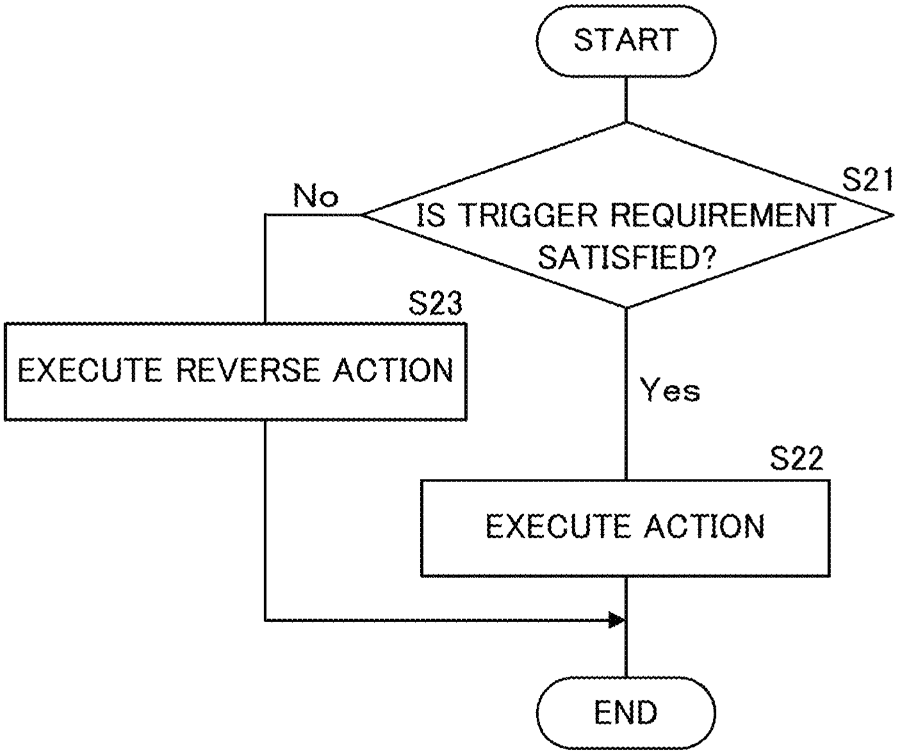
FIG. 7 is a flowchart showing a movement of the CPU 206 when a macro function is enabled.

The CPU 206 associates the trigger requirement with the received action (S13). For example, the CPU 206, when receiving an ON operation of the enable switch 75, associates the trigger requirement with the received action. Alternatively, the CPU 206, when receiving an ON operation of an execution switch (EXE. in the diagram) of the action inputter 76, associates the trigger requirement with the received action. The CPU 206 executes the associated action in a case in which the state of an acoustic device satisfies the trigger requirement. FIG. 7 is a flowchart showing a movement of the CPU 206 when a macro function is enabled. The CPU 206 determines whether or not the state of an acoustic device satisfies the trigger requirement (S21). The CPU 206, in a case of determining that the state of the acoustic device satisfies the trigger requirement (Yes in S21), executes the associated action (S22). Herein, association refers to, for example, that, with respect to an operation A (a received trigger requirement) and an operation B (a received action)

different from the operation A, a movement such that the operation B is automatically executed on the requirement that the operation A is performed is created on a system.

Figure 8:
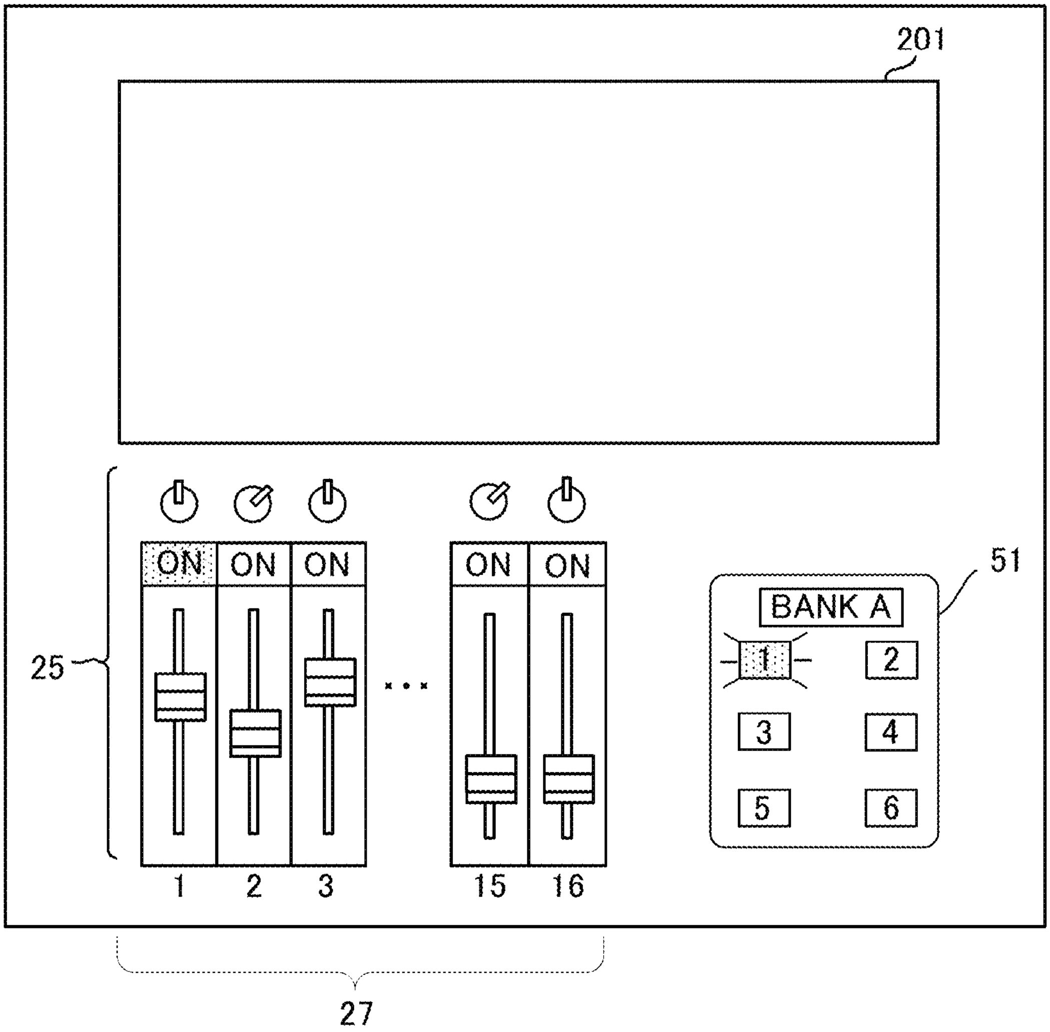
FIG. 8 is a front view of the audio mixer 1 in a case in which a trigger requirement is satisfied.

FIG. 8 is a front view of the audio mixer 1 in a case in which a trigger requirement is satisfied. The trigger requirement received in FIG. 6 is a requirement that the ON switch of the fader of the first input channel is turned ON. Therefore, as shown in FIG. 8, in a case in which the ON switch of the fader of the first input channel is turned ON, the CPU 206 turns the display color of Number 1 of Bank A of a UD key bank in the user-defined key area 51 to blue.

On the other hand, the audio mixer 1 according to the present embodiment receives a reverse action to be performed in a case in which the trigger requirement is not satisfied, on the macro edit screen 71 (S14).

Figure 9:
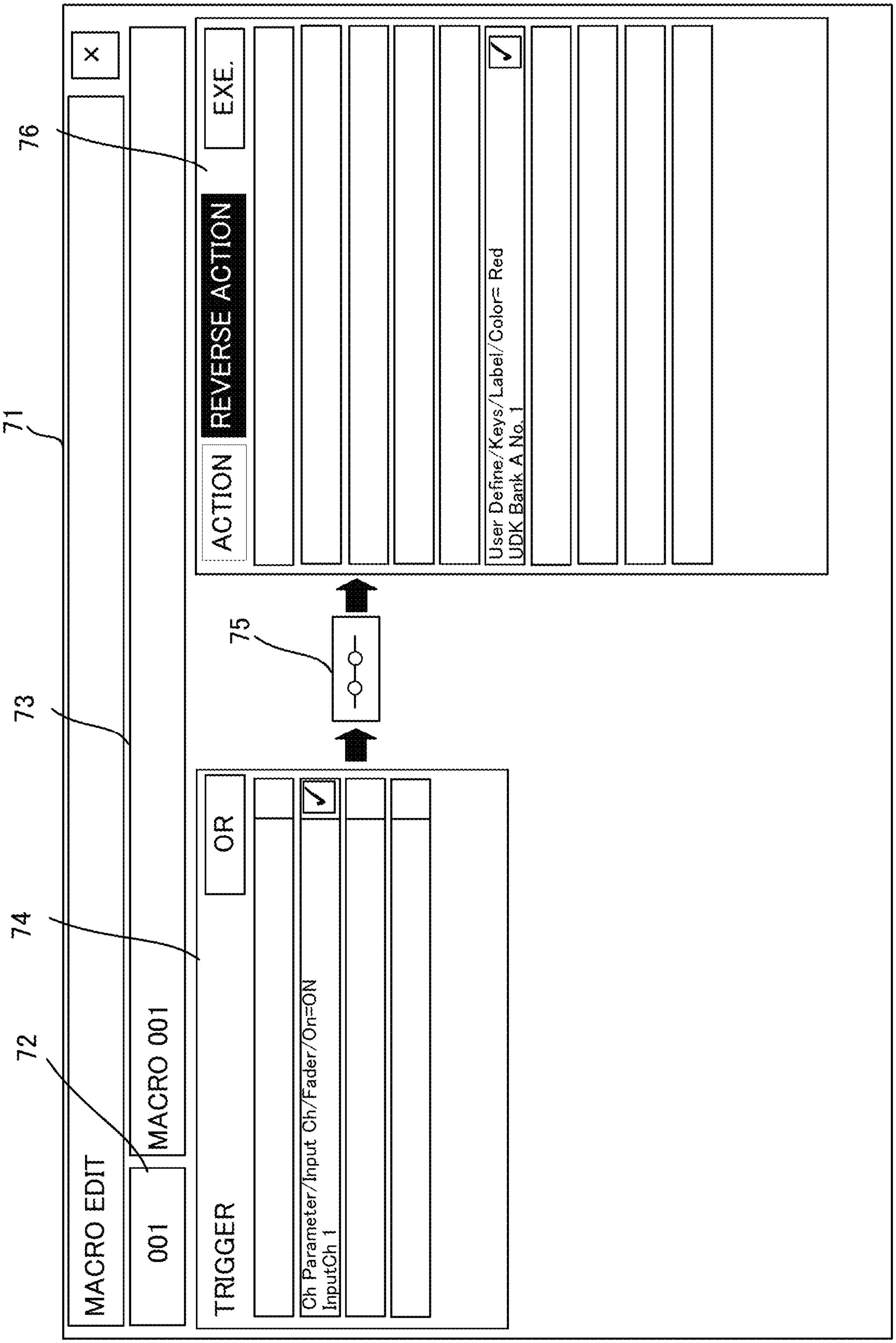
FIG. 9 shows an example of a macro edit screen 71 in a case in which a reverse action is received.

FIG. 9 shows an example of the macro edit screen 71 in a case in which the reverse action is received. When a user selects a reverse action tab (REVERSE ACTION in the diagram) in the action inputter 76, the CPU 206 displays the macro edit screen 71 that receives the reverse action.

In the example of FIG. 9, the user inputs a reverse action into the action inputter 76 displayed on the right side of the macro edit screen 71. In the example of FIG. 9, as the reverse action, a movement such that, in the UD key (Keys in the diagram) of the user definitions (User Define in the diagram), a display color (Label/Color) of Number 1 of Bank A (UDK Bank A No. 1 in the diagram) is turned to red (=Red in the diagram) is inputted.

The CPU 206 associates the trigger requirement with the received reverse action (S15). For example, the CPU 206, when receiving the ON operation of the enable switch 75, associates the trigger requirement with the received reverse action. Alternatively, the CPU 206, when receiving the ON operation of the execution switch (EXE. in the diagram) of the action inputter 76, associates the trigger requirement with the received reverse action. Accordingly, the macro function is enabled. The CPU 206, in a case in which the state of the acoustic device does not satisfy the trigger requirement (No in S21 in FIG. 7), executes the associated reverse action (S23).

Figure 10:
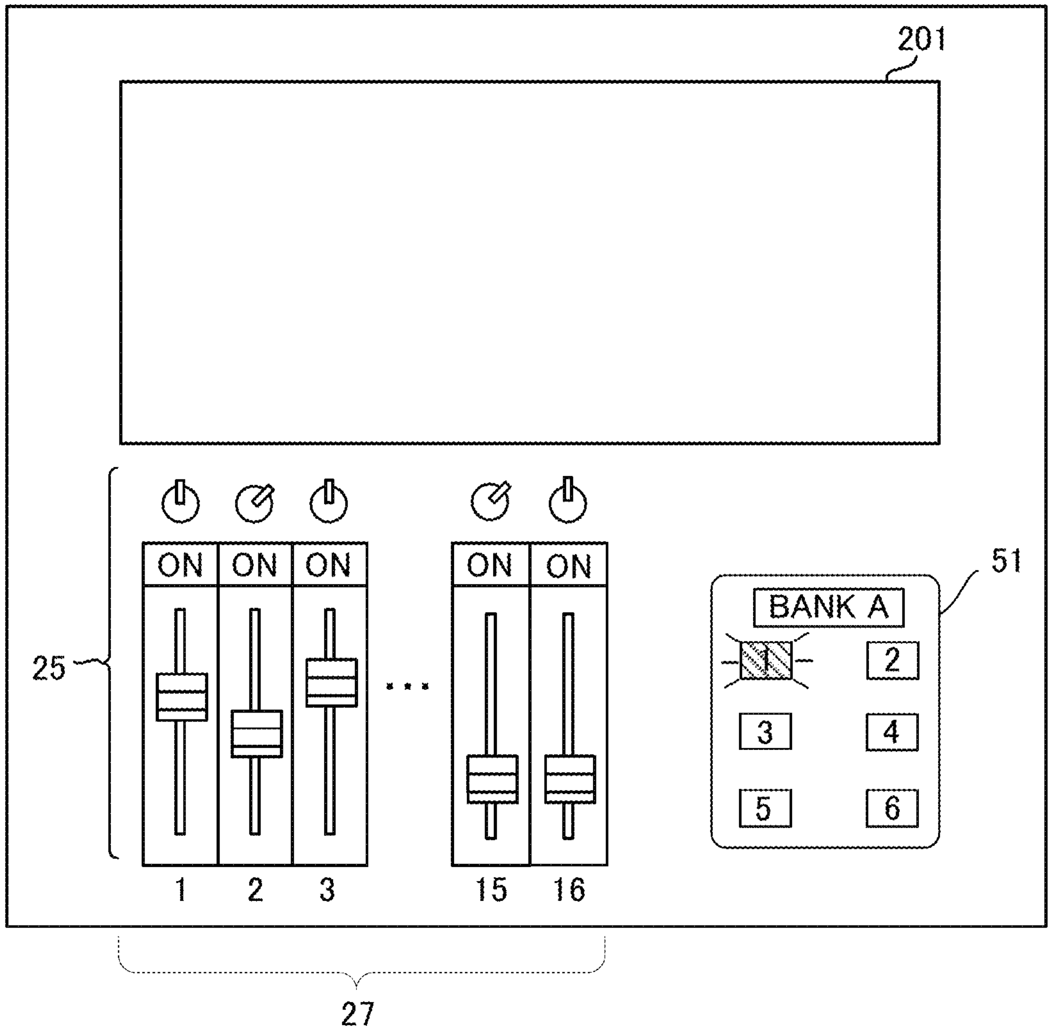
FIG. 10 is a front view of the audio mixer 1 in a case in which the trigger requirement is not satisfied.

FIG. 10 is a front view of the audio mixer 1 in a case in which the trigger requirement is not satisfied. The trigger requirement received in FIG. 6 is a requirement that the ON switch of the fader of the first input channel is turned ON. Therefore, as shown in FIG. 9, in a case in which the ON switch of the fader of the first input channel is turned OFF, the CPU 206 turns the display color of Number 1 of Bank A of the UD key bank in the user-defined key area 51 to red.

It is to be noted that, when the user selects an action tab (ACTION in FIG. 8) in the action inputter 76 in the state of FIG. 9, the CPU 206 displays the macro edit screen 71 shown in FIG. 6.

In other words, the CPU 206 receives a selection of a first receiving state (the macro edit screen 71 of FIG. 6) in which a setting of the action corresponding to the trigger requirement is received or a second receiving state (the macro edit screen 71 of FIG. 9) in which a setting of the reverse action corresponding to the trigger requirement is received, in a state in which the first receiving state is selected, receives the setting of the action corresponding to the trigger requirement, associates the trigger requirement with each of the received action and the reverse action, in a state in which the second receiving state is selected, receives the setting of the reverse action corresponding to the trigger requirement, associates the trigger requirement with each of the received reverse action and the action.

It is to be noted that the trigger requirement is able to receive a plurality of requirements. For example, as shown in FIG. 6 and FIG. 9, the trigger requirement inputter 74 has input fields for a plurality of trigger requirements. The user inputs a requirement into each of the plurality of input fields. In addition, the trigger requirement inputter 74 has a logical expression input field ("OR" in FIG. 6 and FIG. 9). The user inputs a logical expression into the logical expression input field. For example, as shown in FIG. 6 and FIG. 9, in a case in which the user inputs OR, the CPU 206 determines that the trigger requirement is satisfied in a case in which any one of the inputted requirements is satisfied. For example, in a case in which the user inputs AND, the CPU 206 determines that the trigger requirement is satisfied in a case in which all the inputted requirements are satisfied.

In addition, the user can also select a requirement to be enabled among the plurality of requirements that the user has inputted. The trigger requirement inputter 74 has a checkbox. The CPU 206 determines whether or not the trigger requirement is satisfied only for the requirement of which the checkbox the user has checked, in combination with a logical expression.

Each of the action and the reverse action may also receive the plurality of requirements. In addition, each of the action and the reverse action may also select a requirement to be enabled among the plurality of requirements that have been inputted.

In the above example, the CPU 206 receives the trigger requirement, the action, or the reverse action from the user. In the macro edit screen 71 shown in FIG. 6, when the user first selects the reverse action tab in the action inputter 76, the CPU 206 may copy an inputted action to the reverse action. However, the CPU 206 changes the reverse action that differs only in value (the right of "=" shown in FIG. 6 and FIG. 9).

As described above, the audio mixer 1 according to the present embodiment is able to provide a more convenient acoustic device setting method that is able to collectively set a fixed movement when a certain requirement is satisfied and a fixed movement when the requirement is released. For example, although the action shown in FIG. 6 and the reverse action shown in FIG. 8 are able to be received, respectively, as two different macros, the audio mixer 1 according to the present embodiment, with respect to one trigger requirement (the ON switch of the fader of the first input channel is ON), is able to set both an action when the trigger requirement is satisfied and a reverse action when the trigger requirement is not satisfied. As a result, the user can gain a new customer experience of being able to collectively set a movement when the trigger requirement is satisfied and a movement when the trigger requirement is not satisfied, with respect to one trigger requirement.

Figure 11:
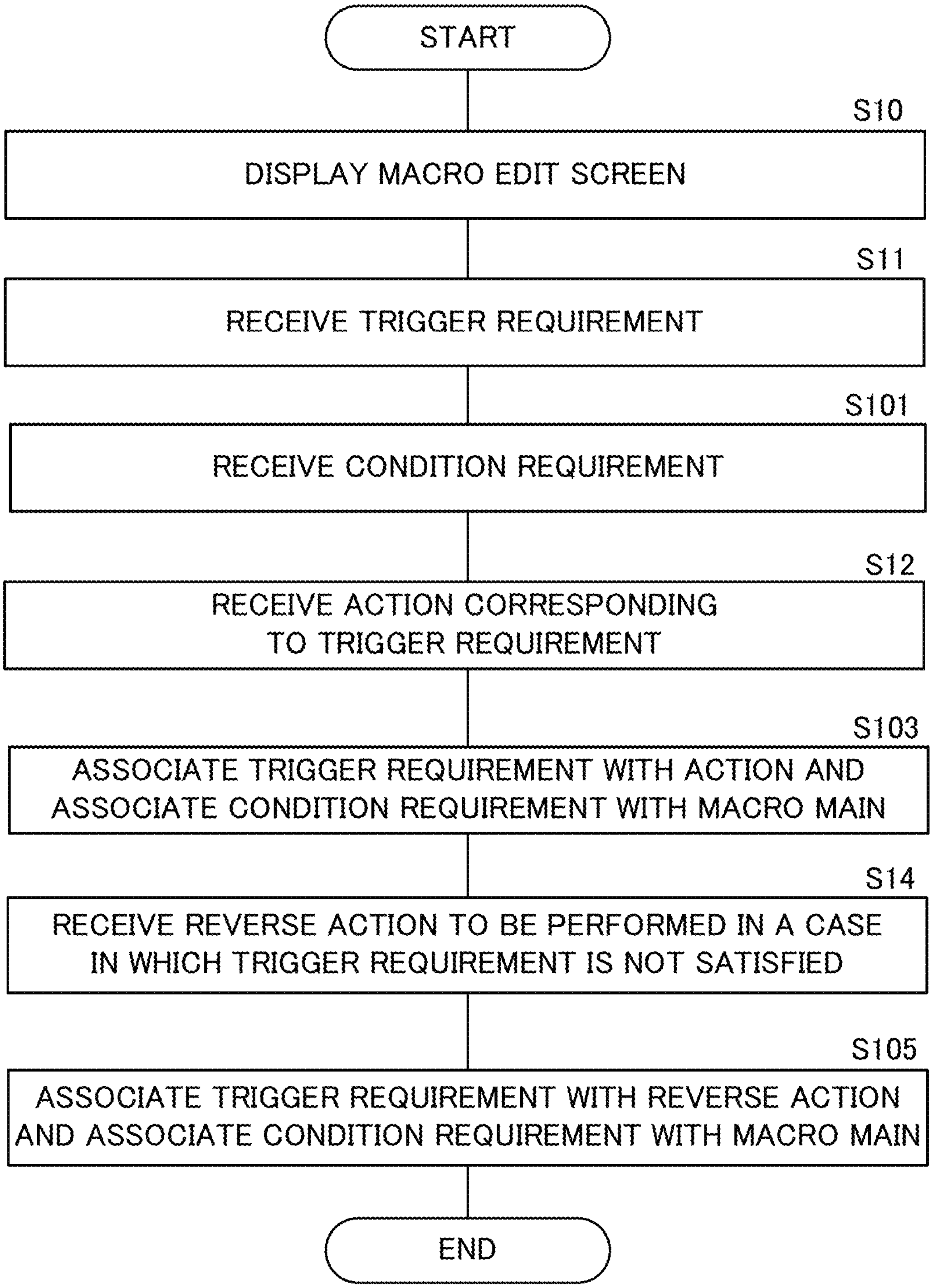
FIG. 11 is a flowchart showing a movement of the acoustic device setting method in a case in which a condition requirement is received.

Next, FIG. 11 is a flowchart showing a movement of the acoustic device setting method in a case in which a condition requirement is received. The same reference numerals are used to refer to movements common to FIG. 5, and the description will be omitted.

The CPU 206 further receives a condition requirement (S101). In addition, the CPU 206 associates the trigger requirement with the received action, associates the received condition requirement with a macro main (S103), associates the trigger requirement with the reverse action, and associates the received condition requirement with the macro main (S105). Herein, the macro main shows the associated trigger and action and the associated trigger and reverse action, being a part of the macro (the enable switch 75 shows a switch that switches enabled/disabled of the macro main).

Figure 12:
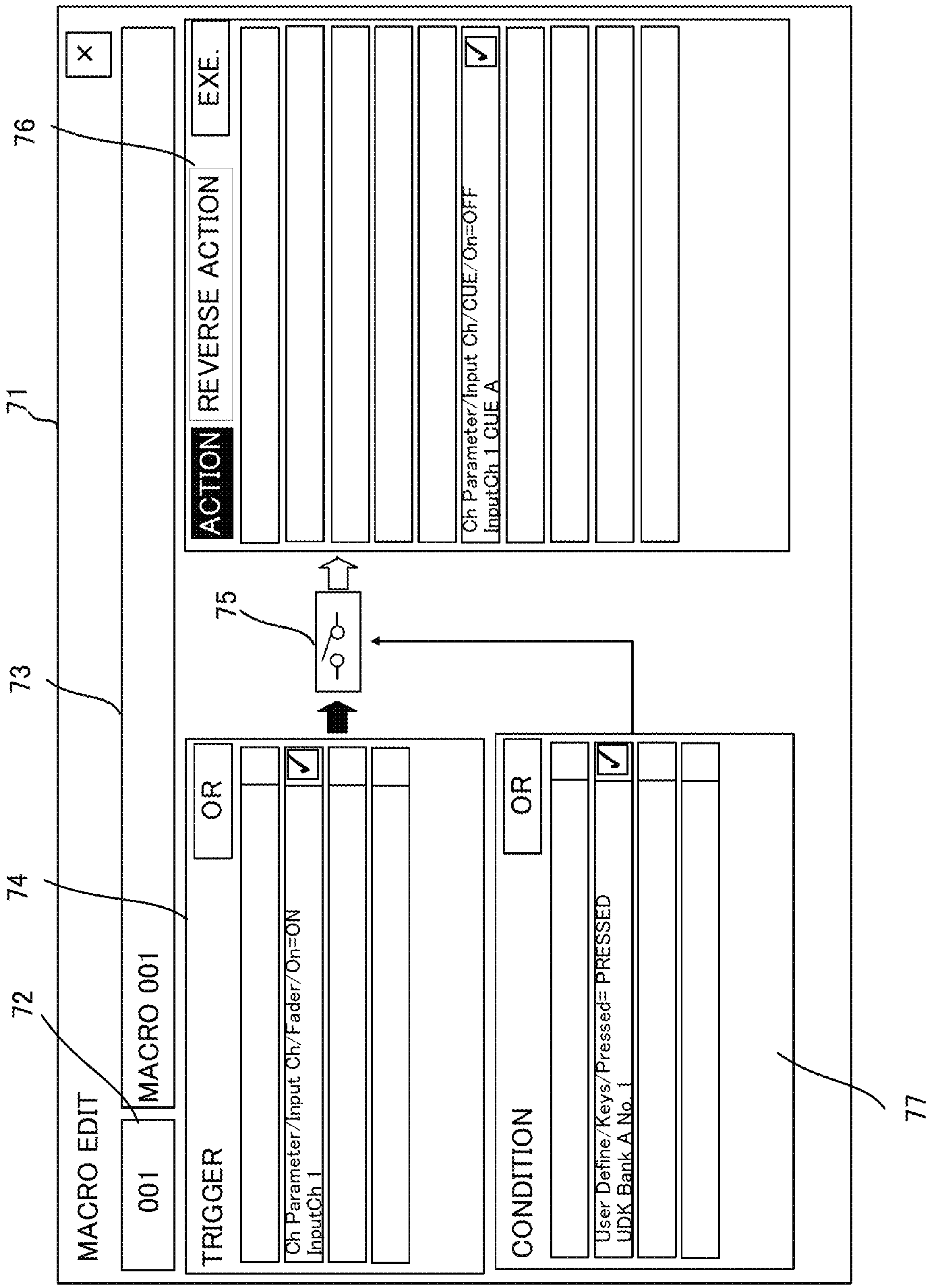
FIG. 12 shows an example of the macro edit screen 71 in the case in which the condition requirement is received.

FIG. 12 shows an example of the macro edit screen 71 in the case in which the condition requirement is received. The macro edit screen 71 of FIG. 12 further has a condition requirement inputter 77. In the example of FIG. 12, the user inputs a condition requirement into the condition requirement inputter 77 displayed on the lower left side of the macro edit screen 71. In the example of FIG. 12, as the condition requirement, a case in which, in the UD key (Keys in the diagram) of the user definitions (User Define in the diagram), Number 1 of Bank A (UDK Bank A No. 1 in the diagram) is pressed (=PRESSED in the diagram) is inputted. It is to be noted that the condition requirement is also able to receive a plurality of requirements. In addition, the condition requirement, in a case of receiving the plurality of requirements, may receive the input of a logical expression.

In the example of FIG. 12, as the action, a movement such that, in a CUE key of the input channel (Input Ch in the diagram) among the parameters (Ch Parameter in the diagram), the ON switch (On in the diagram) of the CUE key (Input Ch 1 CUE A in the diagram) of the first input channel is turned OFF (=OFF in the diagram) is inputted.

Figure 13:
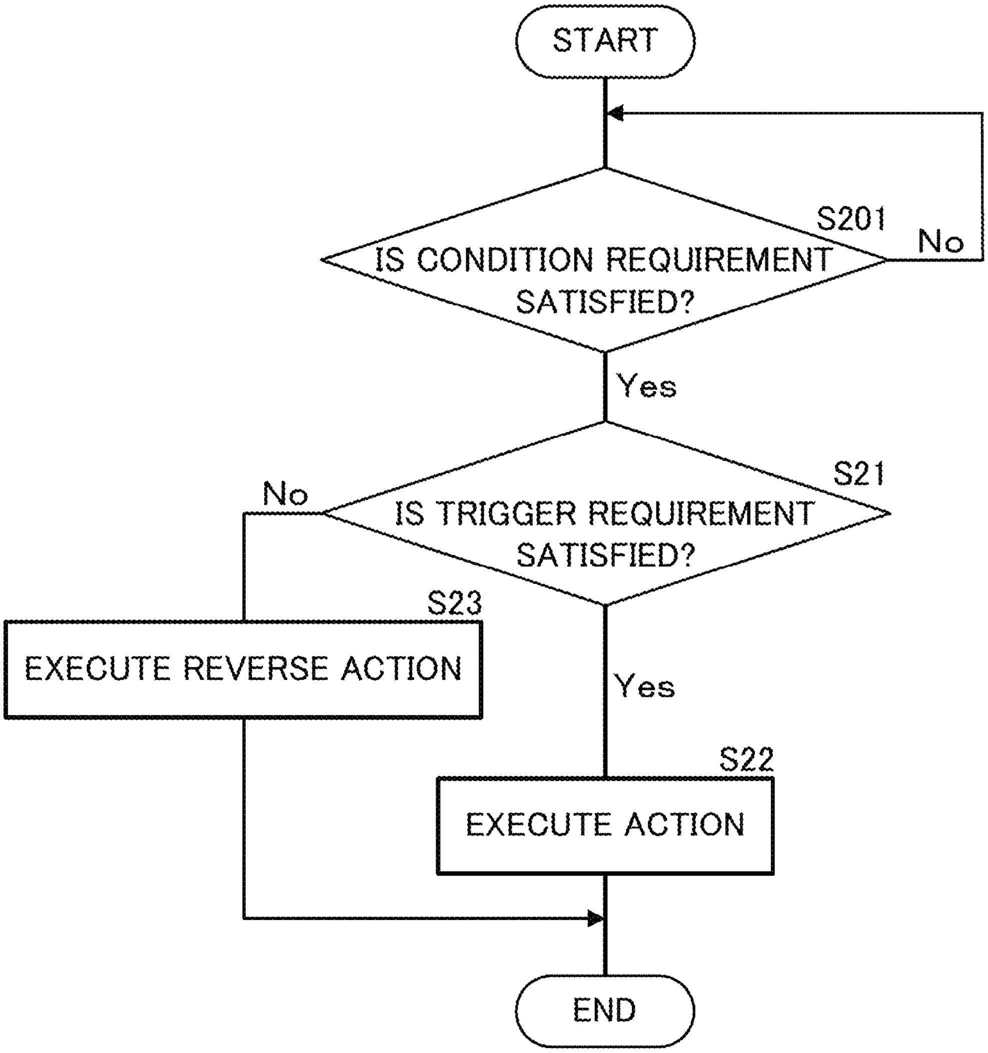
FIG. 13 is a flowchart showing a movement of the CPU 206 when a macro function is enabled.

FIG. 13 is a flowchart showing a movement of the CPU 206 when a macro function is enabled. The same reference numerals are used to refer to movements common to FIG. 7, and the description will be omitted. The CPU 206 determines whether or not the state of an acoustic device satisfies a condition requirement (S201). The CPU 206, in a case of determining that the condition requirement is not satisfied (No in S201), repeats determination from the start.

The CPU 206, in a case of determining that the condition requirement is satisfied (Yes in S201), proceeds to the determination of S21 and executes an action (S22) or a reverse action (S23).

It is to be noted that the CPU 206, in a case in which the condition requirement is not satisfied, as shown in FIG. 12, may display that the enable switch 75 is turned OFF and may inform a user that the condition requirement is not satisfied. As a result, the user can easily understand a state (a state in which the macro main is disabled) in which the action and the reverse action are not executed even in a case in which the trigger requirement is satisfied.

Accordingly, the CPU 206 enables the macro main only in a case in which the condition requirement is satisfied. In other words, the condition requirement functions to disable the macro main when the condition requirement is not satisfied. As a result, the user can easily implement a more complex setting. For example, in the example shown in FIG. 12, only while Number 1 of Bank A of the UD key is pressed, the macro main is enabled. Further, the user prepares a plurality of macros of which the trigger requirement and the action or the reverse action are different, and sets, for example, a color of the UD key to the condition requirement of each macro. Then, the user also prepares a macro to change the color of the UD key when pressing the UD key. In such a case, the macro function to change the movement every time the UD key is pressed is able to be achieved.

Figure 14:
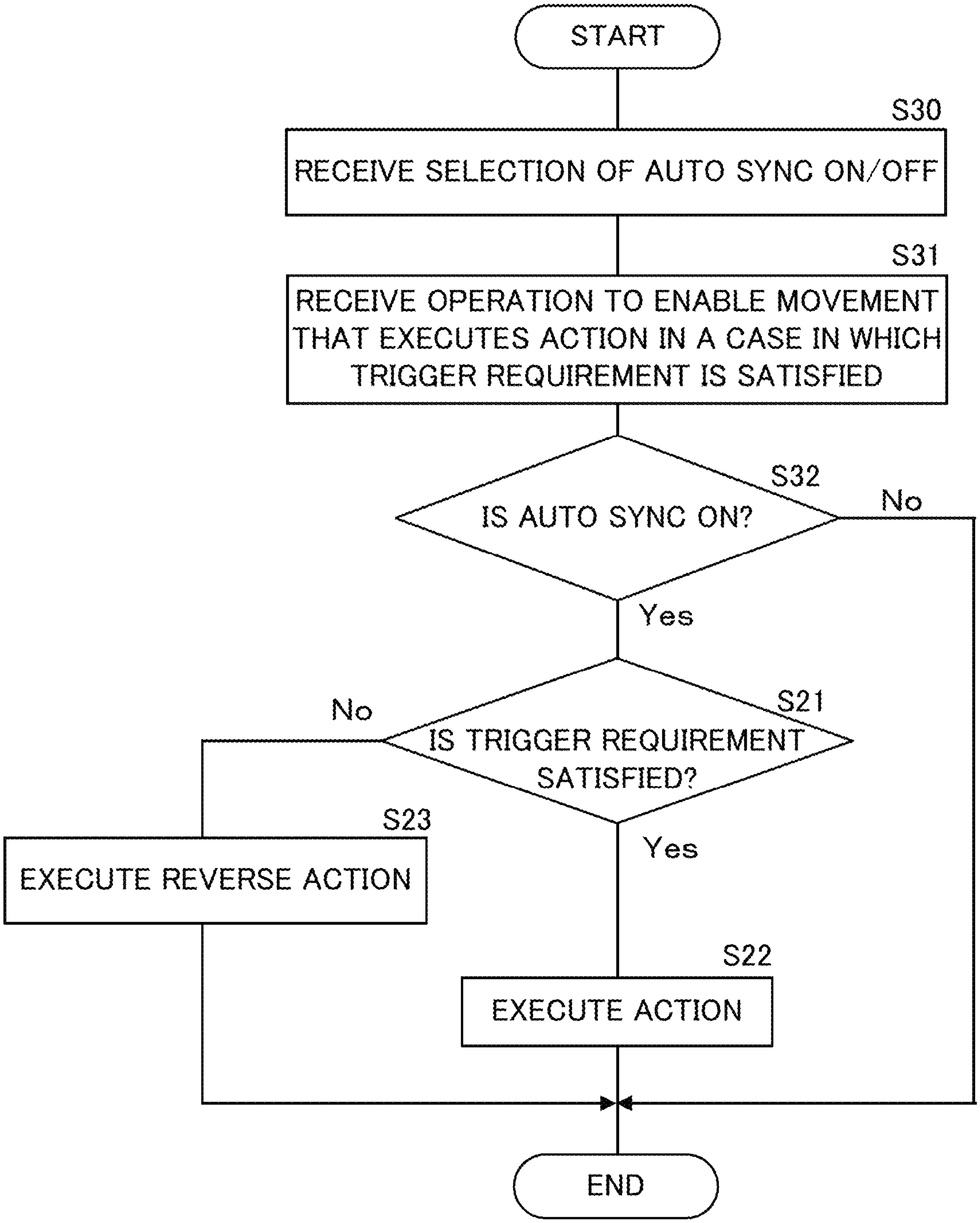
FIG. 14 is a flowchart showing a movement of the acoustic device setting method in a case in which a selection of ON/OFF of auto sync is received.

Next, FIG. 14 is a flowchart showing a movement of the acoustic device setting method in a case in which a selection of ON/OFF of auto sync is received. The same reference numerals are used to refer to movements common to FIG. 7, and the description will be omitted.

Figure 15:
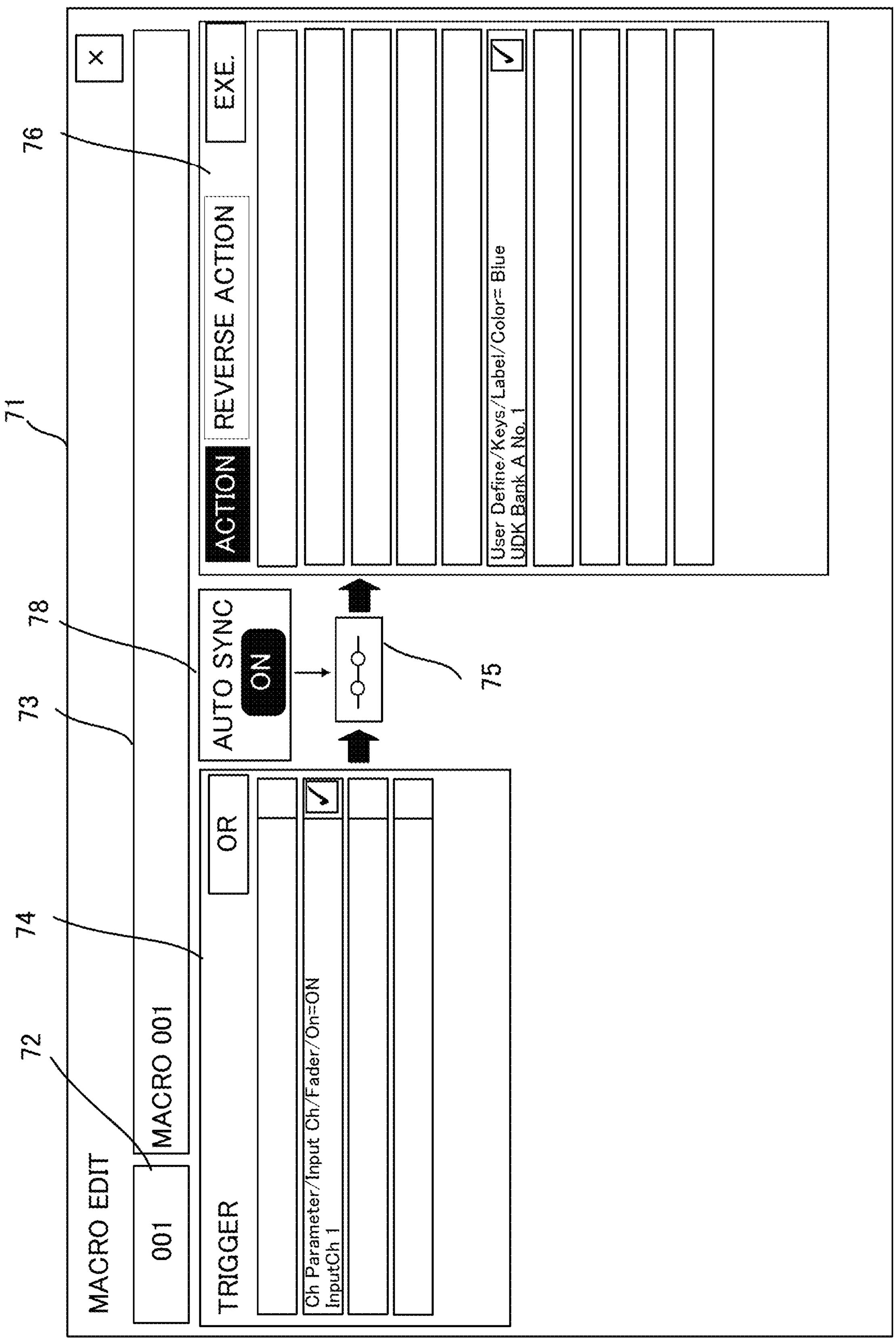
FIG. 15 shows an example of the macro edit screen 71 in the case in which the selection of ON/OFF of the auto sync is received.

The CPU 206 first receives a selection of ON/OFF of the auto sync (S30). The auto sync is a function to match an action to be executed by a trigger requirement with a state of an acoustic device. FIG. 15 shows an example of the macro edit screen 71 in a case in which the selection of ON/OFF of the auto sync is received. The macro edit screen 71 of FIG. 15 further has an auto sync ON/OFF switch 78 being a physical controller for receiving ON/OFF of the auto sync, on the enable switch 75. The user operates the auto sync ON/OFF switch 78 being a physical controller and inputs a selection of ON/OFF of the auto sync. The enable switch 75 is a first physical controller that receives an operation to enable a movement that executes an action, the auto sync ON/OFF switch 78 is a second physical controller that receives ON/OFF of auto sync, and the first physical controller and the second physical controller are installed in close proximity to each other.

Then, the CPU 206 receives an operation (an operation to enable the macro main) to enable the movement that executes the action in a case in which a trigger requirement is satisfied (S31). The CPU 206, when receiving the ON operation of the enable switch 75 or receiving the ON operation of the execution switch (EXE. in the diagram) of the action inputter 76, enables the macro main.

The CPU 206 receives the operation of S31 after S30. In other words, the selection of ON/OFF of the auto sync to match the action to be executed by a trigger requirement with the state of an acoustic device is received before the operation to enable the macro main is received.

Then, the CPU 206 determines whether or not the auto sync is ON when the macro main is enabled (S32). The CPU 206, in a case in which the auto sync is ON, determines whether or not the trigger requirement is satisfied (S21) and executes the action (S22) or the reverse action (S23). In short, the CPU 206, in the case in which the auto sync is ON, executes the corresponding action when the trigger requirement is satisfied and executes the corresponding reverse action when the trigger requirement is not satisfied.

On the other hand, the CPU 206, when enabling the macro main, performs nothing in a case in which the auto sync is OFF (No in S32).

Figure 16:
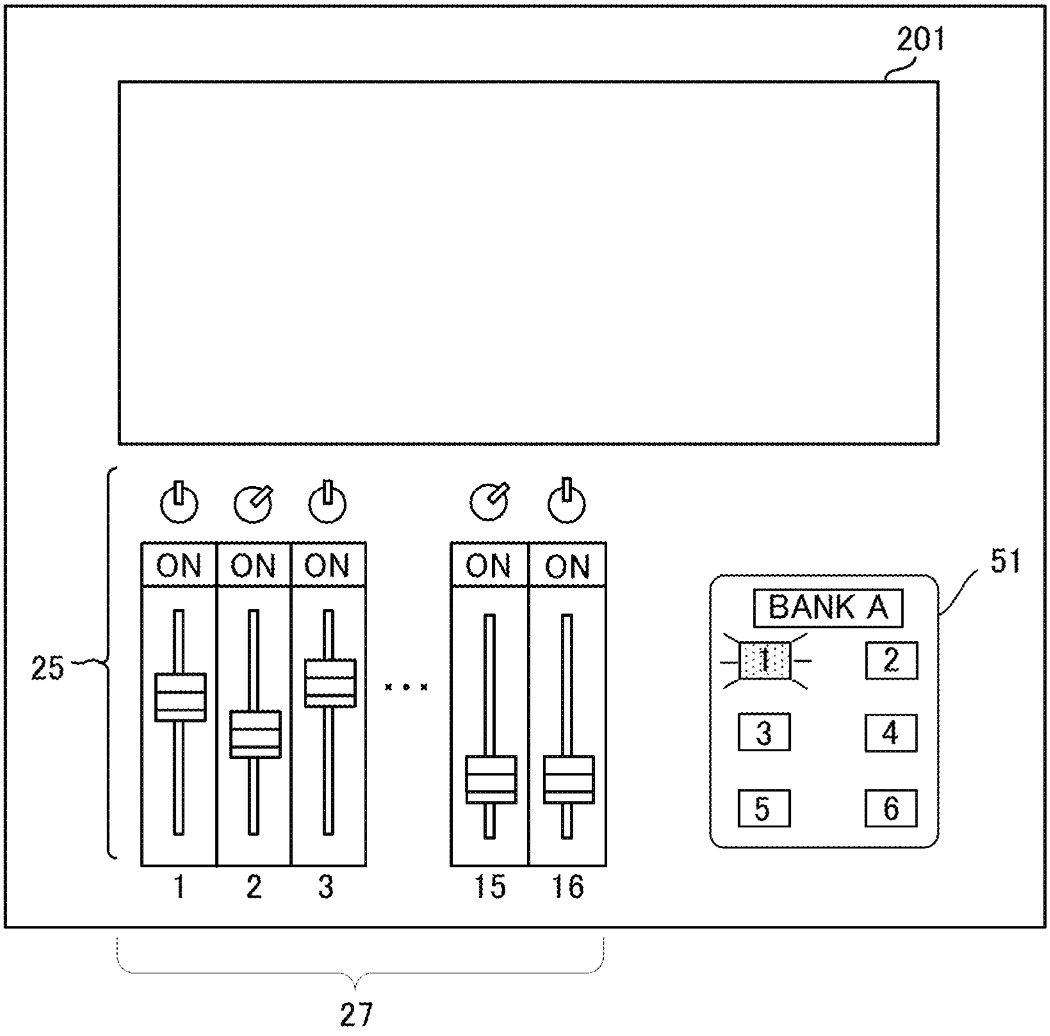
FIG. 16 is a front view of the audio mixer 1 in a case in which the auto sync is OFF.

FIG. 16 is a front view showing an example of a state of the audio mixer 1 before the macro main is enabled. In the example of FIG. 16, the audio mixer 1 is in the state in which the ON switch of the fader of the first input channel is OFF, and the display color of Number 1 of Bank A of is blue in the UD key of the user definitions.

On the other hand, on the macro edit screen 71 shown in FIG. 15, in a case in which the ON switch of the fader of the first input channel is turned ON, in the UD key of the user definitions, the display color of Number 1 of Bank A is turned to blue, which is set to the macro main. In other words, the user, in a case in which the ON switch of the fader of the first input channel is OFF, intends a movement such that, in the UD key of the user definitions, the display color of Number 1 of Bank A is turned to a color other than blue.

In such a state, hypothetically, when the user performs the operation to enable the macro main in a case in which the auto sync is OFF (including a case without an auto sync function), even though the trigger requirement is not satisfied, in the UD key of the user definitions, the display color of Number 1 of Bank A is still blue, and the intention of the user does not match the state of the audio mixer 1.

Figure 17:
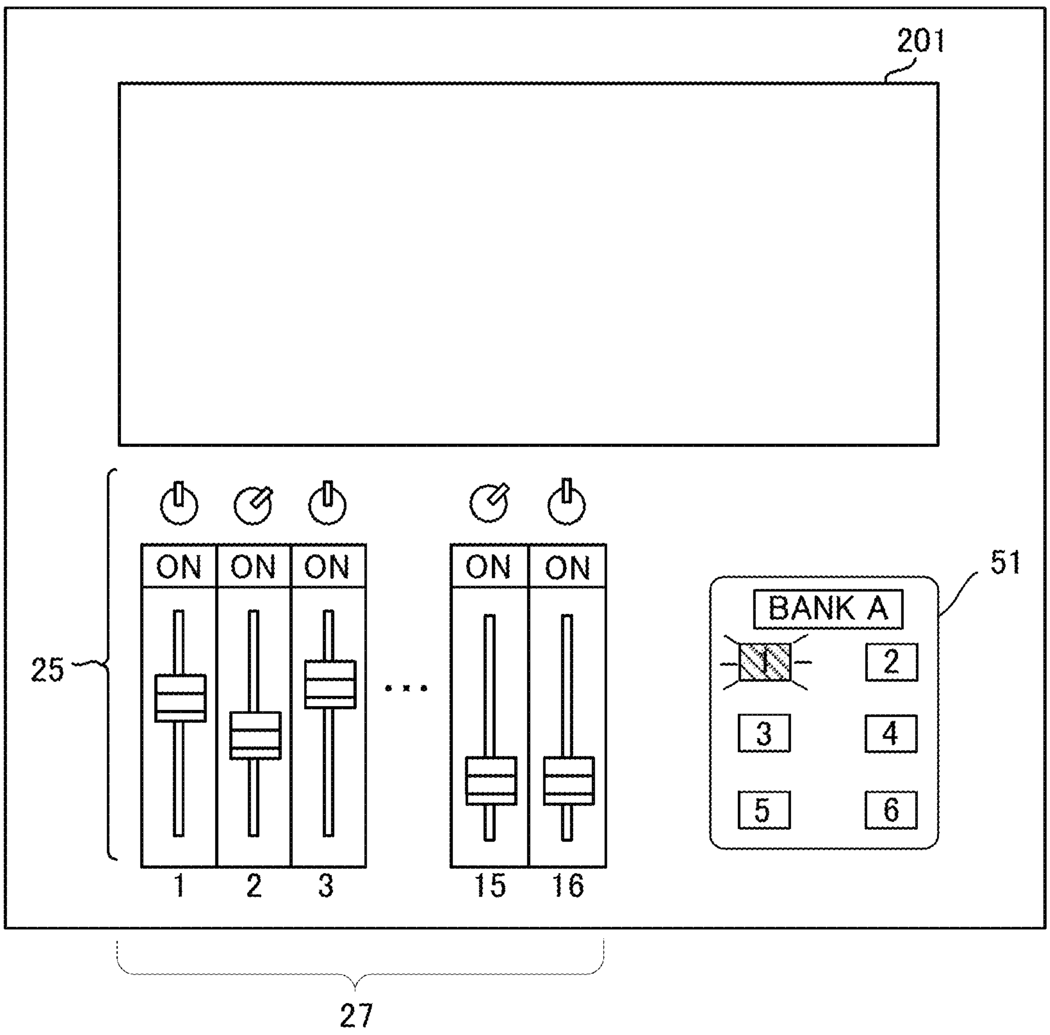

FIG. 17 is a front view of the audio mixer 1 in a case in which the auto sync is ON. When the user performs the operation to enable the macro main in the case in which the auto sync is ON, the CPU 206 executes a reverse action. For example, in a case in which the reverse action, as shown in FIG. 9, is a movement to turn the display color of Number 1 of Bank A in the UD key of the user definitions to red, the CPU 206 turns the display color of Number 1 of Bank A in the UD key to red, as shown in FIG. 17. As a result, in the UD key in the user definitions, the display color of Number 1 of Bank A is turned to a color other than blue, so that the intention of the user matches the state of the audio mixer 1.

It is to be noted that, in the above embodiment, in the case in which the auto sync is ON, the CPU 206 matches the action executed by the trigger requirement by executing the reverse action, with the state of the acoustic device. However, the CPU 206 may match an action executed by a trigger requirement by executing a movement other than the reverse action, with the state of the acoustic device. For example, the CPU 206, even in a case in which the reverse action is not set, may turn the display color of Number 1 of Bank A in the UD key to red. In such a case as well, in the UD key in the user definitions, the display color of Number 1 of Bank A is turned to a color other than blue, so that the intention of the user matches the state of the audio mixer 1. In any case, the CPU 206 matches the action with the state of the acoustic device not by changing the trigger requirement but by changing the state of the acoustic device so as to be corresponded to the trigger requirement.

In such a manner, in the case in which the auto sync is ON, the audio mixer 1 is able to match the action to the trigger requirement with the state of a device. Accordingly, the user does not feel uncomfortable.

The descriptions of the present embodiments are illustrative in all points and should not be construed to limit the present disclosure. The scope of the present disclosure is defined not by the foregoing exemplary embodiments but by the following claims. Further, the scope of the present disclosure is intended to include all modifications within the scopes of the claims and within the meanings and scopes of equivalents.

What is claimed is:

1. A sound apparatus comprising:
an acoustic device setting apparatus; and
a controller that is configured to
receive a trigger requirement associated with an action and a reverse action;
receive the action corresponding to the trigger requirement;
associate the trigger requirement with the received action;
receive the reverse action that is performed in a case in which the trigger requirement is not satisfied;
associate the trigger requirement with the received reverse action;
receive a selection of a first receiving state in which a setting of the action corresponding to the trigger requirement is received or a second receiving state in which a setting of the reverse action corresponding to the trigger requirement is received;
receive, in the selected first receiving state, the setting of the action corresponding to the trigger requirement, and associating the received action and the reverse action with the trigger requirement;
receive, in the selected second receiving state, the setting of the reverse action corresponding to the trigger requirement;
associate the received reverse action and the action with the trigger requirement.

2. The sound apparatus according to claim 1, wherein the trigger requirement corresponds to a state of a physical controller configured to designate sound processing to an input, mixture, or output of an audio signal.

3. The sound apparatus according to claim 1, wherein the controller is also configured to receive the trigger requirement, the action, and the reverse action from a user.

4. The sound apparatus according to claim 1, wherein the controller is also configured to
receive a condition requirement;
associate the trigger requirement with the action and associates a macro main showing the associated trigger requirement and action with the condition requirement;
determine that the condition requirement is satisfied and execute the action, in a case in which the trigger requirement is satisfied;
associate the trigger requirement with the reverse action and associate a macro main showing the associated trigger requirement and reverse action with the condition requirement; and
determine that the condition requirement is satisfied and execute the reverse action, in the case in which the trigger requirement is not satisfied.

5. The sound apparatus according to claim 1, wherein the controller is also configured to
receive an operation to enable a movement that executes the action in a case in which the trigger requirement is satisfied;
receive a selection of ON/OFF of auto sync that matches the action executed by the trigger requirement with a state of an acoustic device, before receiving the operation to enable the movement; and
execute the action or the reverse action, in a case in which the auto sync is ON when enabling the movement.

6. An acoustic device setting method comprising:
receiving a trigger requirement to be associated with an action and a reverse action;
receiving the action corresponding to the trigger requirement;
associating the trigger requirement with the received action;
receiving the reverse action to be performed in a case in which the trigger requirement is not satisfied;
associating the trigger requirement with the received reverse action;
receiving a selection of a first receiving state in which a setting of the action corresponding to the trigger requirement is received or a second receiving state in which a setting of the reverse action corresponding to the trigger requirement is received;
receiving, in the selected first receiving state, the setting of the action corresponding to the trigger requirement, and associating the received action and the reverse action with the trigger requirement;
receiving, in the selected second receiving state, the setting of the reverse action corresponding to the trigger requirement; and
associating the received reverse action and the action with the trigger requirement.

7. The acoustic device setting method according to claim 6, wherein the trigger requirement corresponds to a state of a physical controller for designating sound processing to an input, mixture, or output of an audio signal.

8. The acoustic device setting method according to claim 6, wherein the trigger requirement, the action, and the reverse action are received from a user.

9. The acoustic device setting method according to claim 6, further comprising:
receiving a condition requirement;
associating the trigger requirement with the action and associating a macro main showing the associated trigger requirement and action with the condition requirement;

determining that the condition requirement is satisfied and executing the action, in a case in which the trigger requirement is satisfied;

associating the trigger requirement with the reverse action and associating a macro main showing the associated trigger requirement and reverse action with the condition requirement; and determining that the condition requirement is satisfied and executing the reverse action, in the case in which the trigger requirement is not satisfied.

10. The acoustic device setting method according to claim 6, further comprising:

receiving an operation to enable a movement that executes the action in a case in which the trigger requirement is satisfied;

receiving a selection of ON/OFF of auto sync that matches the action executed by the trigger requirement with a state of an acoustic device, before receiving the operation to enable the movement; and executing the action or the reverse action, in a case in which the auto sync is ON when enabling the movement.

11. A non-transitory computer-readable storage medium storing a program, which when executed causes an acoustic device setting apparatus to:

receive a trigger requirement to be associated with an action and a reverse action;

receive the action corresponding to the trigger requirement;

associate the trigger requirement with the received action;

receive the reverse action to be performed in a case in which the trigger requirement is not satisfied;

associate the trigger requirement with the received reverse action;

receive a selection of a first receiving state in which a setting of the action corresponding to the trigger requirement is received or a second receiving state in which a setting of the reverse action corresponding to the trigger requirement is received;

receive, in the selected first receiving state, the setting of the action corresponding to the trigger requirement, and associating the received action and the reverse action with the trigger requirement;

receive, in the selected second receiving state, the setting of the reverse action corresponding to the trigger requirement; and associating the received reverse action and the action with the trigger requirement.

* * * * *